May 20, 1969   R. W. SICKA ET AL   3,445,361
WHISKER REINFORCED COMPOSITE MATERIALS PRODUCED
BY ELECTROPHORETIC DEPOSITION
Filed May 4, 1966

INVENTORS
Richard W. Sicka
Selwyn H. Rose
Theodore M. Harkulich
BY
Lawrence I. Field
ATTORNEY

United States Patent Office 3,445,361
Patented May 20, 1969

3,445,361
WHISKER REINFORCED COMPOSITE MATERIALS PRODUCED BY ELECTROPHORETIC DEPOSITION
Richard W. Sicka, Brecksville, Selwyn H. Rose, Warrensville Heights, and Theodore M. Harkulich, Chagrin Falls, Ohio, assignors to Horizons Research Incorporated, a corporation of Ohio
Filed May 4, 1966, Ser. No. 547,665
Int. Cl. C23c 13/04
U.S. Cl. 204—181                                    5 Claims

ABSTRACT OF THE DISCLOSURE

Whisker reinforced composite materials are produced by a process in which the whisker material, in suspension, is electrophoretically deposited on a conductive filament moving through the suspension, whereby the whiskers are deposited aligned parallel to the axis of the filament.

---

This invention relates to the use of single crystal fibers, commonly designated as whiskers, to provide reinforcement in composite materials.

Usual dimensions for individual whiskers are lengths of between about 500 and 10,000 microns and widths or diameters of between about 0.1 and 5 microns. The mechanical properties of whiskers, particularly their ultra-high strength, make them excellent candidates for reinforcing materials. To obtain the maximum advantage from the strength of the whiskers and to provide efficient whisker packing, it is necessary that the whiskers be as fully oriented in a desired direction as possible.

While composites have been fabricated utilizing aligned whiskers, the whiskers have been aligned manually. Obviously, this procedure is not amenable to large scale fabrication of whisker composite materials. The lack of suitable physico-mechanical procedures for achieving whisker alignment without damage to the whiskers has, heretofore, prevented the successful utilization of whiskers to reinforce composites. Failure to align 100% of the whiskers in a given direction results in only partial utilization of the whiskers strength and in non-uniform distribution of the whiskers throughout the matrix. In such cases difficulty is encountered in further processing to achieve densification, leading to situations characterized by heterogeneous structure and poor load bearing capabilities.

A principal object of this invention is to provide a method and apparatus for achieving alignment of the entire whisker content present in composite materials.

A more specific object of this invention is to provide new and useful reinforced composite materials in which the principal reinforcement comprises single crystal fibers of $Al_2O_3$, $Si_3N_4$, BN, SiC or various metals or other materials which are available as whiskers, and in which the whiskers are substantially all aligned along a selected axis of the composite.

Such composites are produced by moving an ultra-fine filament or wire through a suspension containing the whiskers and electrophoretically depositing the whiskers along the length of the wire or filament and thereafter processing the resulting composite material in any of a number of well known ways.

It has been observed that alignment of the whiskers lengthwise parallel to the direction of an electrically conductive filament is achieved by the application of a D.C. electric field applied to an ultra-fine conductive filament and to a suitable liquid containing the individual whiskers. While not wishing to be bound by a statement concerning the mechanism of deposition, we feel that deposition of whiskers with alignment results from the interaction of the electric field around the ultra-fine diameter conductive filament and the surface charge distributed over the long deflocculated (and/or binder-coated) whiskers. Presumably this interaction causes the whiskers to be electrophoretically deposited with major axis parallel to the axis of the conductive filament. An additional factor which can aid alignment of whiskers is the rapid movement of the filament through the suspension resulting in flow refringence forces acting on the whiskers during their deposition.

The deposition of whiskers on the ultra-fine diameter conductive filament is achieved by passing the conductive filament under the surface of the whisker suspension and applying a suitable D.C. potential across the suspension by means of the ultra-fine conductive filament and another suitable electrode. Concurrently with migration of the (deflocculated and/or binder-coated) whiskers to the filament, the filament is drawn through the whisker suspension and wound on the take-up reel of a conventional winding machine.

The invention will be better understood by reference to the drawings accompanying this application, in which FIGURE 1 shows the manner in which the whiskers are aligned on the filament, in one apparatus for carrying out the coating step of this invention;

Figure 1:
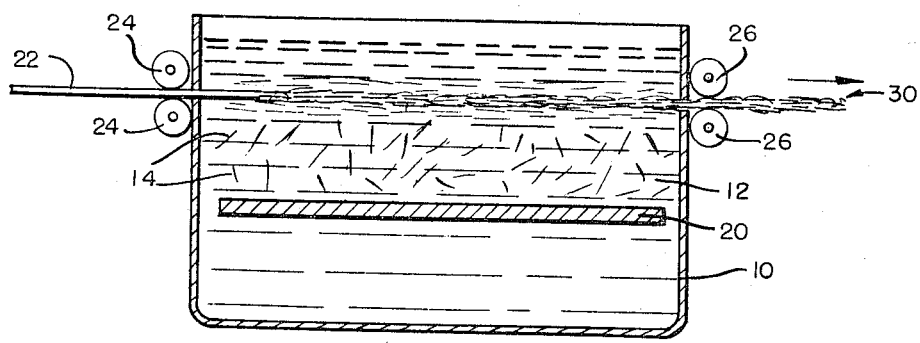

As shown in FIGURE 1 the electrophoretic deposition apparatus comprises a tank 10 containing a suspension 12 of whiskers 14 in a polar liquid 16. The tank contains an electrode 20 located adjacent to an ultra-fine diameter filamentary electrode 22 of a polarity opposite to that of electrode 20, provided from a supply (not shown) and guided into tank 10 by pulleys 24 and guided from tank 10 by another pair of rotatable guides 26.

Figure 2:
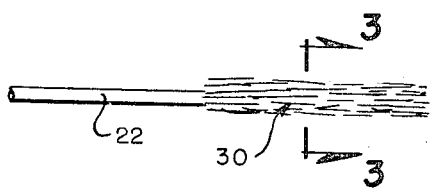
FIGURE 2 is a schematic view of a fiber reinforced filament.
Figure 3:
FIGURE 3 is a section taken on plane 3—3 of FIGURE 2.

The product 30 leaving tank 10 consists of a conductive filament core 22 encased in a whisker mixture 34 in which the individual whiskers are distributed as shown in FIGURES 2 and 3, there being numerous layers of whiskers bound to the filament, e.g. one to five mil coating of whiskers on a one mil wire.

Figure 4:
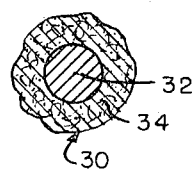
FIGURE 4 is a similar view showing a composite resulting from impregnation of the composite.

It is desirable that a binder be included in the composite and this may be accomplished either by depositing the binder simultaneously with the whiskers or by later depositing same by any convenient technique such as impregnation, spraying or the like. FIGURE 4 shows a product like that in FIGURE 3 except that it contains additional binder.

The following examples will serve to further illustrate the invention:

EXAMPLE 1

A suspension was prepared by mixing together 2 parts by weight of chromized $Al_2O_3$ whiskers ($Al_2O_3$ whiskers provided with a layer of chromium metal approximately equal in weight to the weight of the whiskers) and the remainder water. A few drops of ammonium tannate was added to polarize and deflocculate the suspension.

Using the apparatus of FIGURE 1, copper wires 0.4 to 1 mil diameter were coated electrophoretically in the suspension. When examined under a microscope it was found that the whiskers were all aligned as a coating on the surface of copper wire with the lengthwise direction of the whiskers extending in the same direction as the length of the copper filament.

EXAMPLE 2

A suspension was prepared by mixing together 2 parts by weight of chromized $Al_2O_3$ whiskers ($Al_2O_3$ whiskers provided with a layer of chromium metal approximately equal in weight to the weight of the whiskers); 1 part by weight of acrylamide-acrylic acid copolymer; and the remaining 97% by weight water. Ammonium tannate was added to deflocculate and polarize the suspension.

Copper wires 0.4 to 2 mil diameter were coated electrophoretically therein and when examined it was found that the whiskers were all aligned in the copolymer coating on the copper wire in the same manner as in Example 1.

EXAMPLE 3

Using a tungsten wire and the following coating suspension:

| | Weight percent |
|---|---|
| $Al_2O_3$ whiskers | 2.0 |
| Epoxy resin (Araldite 6005) | 0.9 |
| Methylisobutyl ketone | 97.0 |
| Curing agent (borate ester) | 0.1 |

After the filament was coated it was passed through a heated furnace to cure the resin; thus, a whisker reinforced filamentary composite resulted. In another run, the coated wire was wound on a heated mandrel to effect cure of the resin in the form of a wound structure.

The resulting composites consisted of

| | Percent by volume |
|---|---|
| $Al_2O_3$, about | 23 |
| Tungsten filament | 4 |
| Epoxy | 73 |

It is also possible to include other solids in the coating suspension, particularly metal, alloy and ceramic powders, as shown in the following example.

EXAMPLE 4

Using the apparatus of FIGURE 1 a silver wire was coated from a coating suspension comprising:

| | Weight percent |
|---|---|
| $Al_2O_3$ whiskers (platinized) | 2 |
| Acrylamide-acrylic acid copolymer | 1 |
| Silver powder (micron size) | 1 |
| Water | 96 |

Composites were obtained by electrophoretic deposition in like fashion from the following formulations.

EXAMPLE 5

| | Weight percent |
|---|---|
| $Al_2O_3$ whiskers | 2 |
| Urea formaldehyde (XB–1033—40% solution in water) | 1 |
| Methyl alcohol | 55 |
| Water | 42 |

This composition was used after adjusting the pH to about 9 by the addition of $NH_4OH$.

EXAMPLE 6

| | Weight percent |
|---|---|
| $Al_2O_3$ whiskers | 2 |
| Phenolic resin (BRP5417) | 2 |
| Methyl alcohol | 48 |
| Acetone | 48 |

Electrophoretic coatings were deposited from this composition at voltages of about 100 volts and 100 ma. current.

The resistivity of the composition was between 100 and 10,000 ohm-cm.

EXAMPLE 7

| | Weight percent |
|---|---|
| SiC whiskers | 3.0 |
| Epoxy resin (Araldite 6005) | 3.0 |
| Curing agent (Araldite hardener 906) | 2.5 |
| Methylisobutyl ketone, balance. | |

EXAMPLE 8

The composite prepared as in Example 1 was infiltrated with silver until it was completely impregnated. The resulting composite contained about 90% silver by weight (38% silver by volume).

Graphite, $Al_2O_3$, $TiO_2$, $ZrO_2$, BeO, SiC, TiC, $B_4C$, TiN, AlN, WB, $Si_3N_4$ and a variety of metals have been used as whiskers, having due regard to the polarity of the charge which they develop when suspended in a polar liquid.

The filament which is coated with the aligned whiskers may be electrically conductive, e.g. a metal or alloy or it may be a normally non-conductive organic or inorganic material which has been made sufficiently electrically conductive by virtue of a metal coating applied to the glass, resin or ceramic base.

The matrix material in which the whiskers are supported at the time they are deposited may be organic, metallic or ceramic depending on the intended further processing of the composite. For example, by coating a conductive filament with whiskers distributed in a polymeric binder, and then heat curing the composite, a filamentary microcomposite is immediately obtained consisting of a conductive filament and a whisker reinforced resin. Another procedure which has been used comprised winding the filament after coating with whisker and resin mixture and then curing the wound structure produced sizable whisker reinforced plastic composites. The conductive filament may be either an ultra-fine metal wire or a metallized glass or resin filament, or any other sufficiently conductive finely divided elongated strand.

If the deposited whiskers are metal coated and deposited on a suitable ultra-fine metal wire along with a binder, a whisker reinforced metal composite will result after burning out the binder and sintering to densification. Variations include the deposition of ceramic powder or ultra-fine metal powder concurrently with metallized or uncoated whiskers, or subsequent thereto, e.g. by spraying or impregnation.

The liquid vehicle for the whisker suspension may be water or any other polar vehicle with a relatively low solution viscosity. The binder may serve to aid deflocculation of whiskers and may be sufficiently polar to be electrophoretically deposited.

Having now described a preferred embodiment of this invention it is not intended that it be limited except as may be required by the appended claims.

We claim:

1. A process for producing a whisker reinforced composite which comprises:
    preparing a coating composition of whiskers suspended in a liquid;
    moving an ultra-fine filament through said composition while impressing an electrical potential between said filament and said liquid; and
    electrophoretically depositing said whiskers from said suspension onto said filament, the deposited whiskers being aligned lengthwise parallel to the length of said filament.

2. A process as in claim 1 in which the coating suspension contains up to about 50% of whiskers, by weight.

3. A process as in claim 1 in which the suspension includes a binder adapted to be deposited on said filament, concurrently with said whiskers.

4. A process as in claim 1 in which the whiskers are metal coated whiskers.

5. A whisker reinforced composite material comprising an electrically conductive ultra-fine filamentary core and disposed around said core, as a coating, aligned whiskers in a matrix material, the coating having been deposited on said core by electrophoresis, according to the process of claim 1, and the deposited whiskers being aligned lengthwise parallel to the length of said filament.

(References on following page)

References Cited

UNITED STATES PATENTS

| | | | |
|---|---|---|---|
| 2,576,362 | 11/1951 | Rimbach | 204—181 |
| 2,585,534 | 2/1952 | Bull et al. | 204—181 |
| 2,848,391 | 8/1958 | Fahnoe et al. | 204—181 |
| 2,956,937 | 10/1960 | Thomson | 204—181 |
| 3,037,923 | 6/1962 | Gnau | 204—181 |
| 3,067,120 | 12/1962 | Pearlstein | 204—181 |
| 3,093,511 | 6/1963 | Weisel et al. | 204—181 |
| 3,100,186 | 8/1963 | McNeill et al. | 204—181 |

JOHN H. MACK, *Primary Examiner.*

E. ZAGARELLA, JR., *Assistant Examiner.*

U.S. Cl. X.R.

117—31